(12) United States Patent
Anderson et al.

(10) Patent No.: US 7,728,912 B2
(45) Date of Patent: Jun. 1, 2010

(54) DISPLAY SYSTEM

(75) Inventors: Daryl E. Anderson, Corvallis, OR (US);
Andrew L. Van Brocklin, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1134 days.

(21) Appl. No.: 10/959,776

(22) Filed: Oct. 6, 2004

(65) Prior Publication Data
US 2006/0072015 A1 Apr. 6, 2006

(51) Int. Cl.
*H04N 5/64* (2006.01)
*H04N 9/31* (2006.01)

(52) U.S. Cl. ............... 348/744; 348/781; 348/790; 348/800

(58) Field of Classification Search ......... 348/195–196, 348/202–203, 744–745, 750–751, 790–791, 348/800–804, 781; 345/82, 204, 506, 522, 345/519, 545, 98, 87, 89, 76; 359/464, 478, 359/45, 72; 353/7, 63, 84; *H04N 5/64, 9/31*
See application file for complete search history.

(56) References Cited

U.S. PATENT DOCUMENTS

| 4,979,030 | A | * | 12/1990 | Murata ................. 348/196 |
| 5,422,693 | A | * | 6/1995 | Vogeley et al. ........... 353/122 |
| 5,566,012 | A | * | 10/1996 | Koshimizu et al. ....... 349/116 |
| 5,694,180 | A | * | 12/1997 | Deter et al. ............ 348/746 |
| 5,920,361 | A | * | 7/1999 | Gibeau et al. ........... 348/750 |
| 5,936,767 | A | * | 8/1999 | Favalora ................. 359/462 |
| 6,945,652 | B2 | * | 9/2005 | Sakata et al. ............ 353/30 |

* cited by examiner

*Primary Examiner*—Trang U Tran

(57) ABSTRACT

A display system has a device for projecting a light beam and a display. The light beam includes encoded data. The display includes light sources selectively activated according to the encoded data received from the device.

23 Claims, 4 Drawing Sheets

DISPLAY SYSTEM

BACKGROUND

Digital projection display systems may form an image, usually pixel by pixel, and project the image onto a display surface. The components for forming the image to be projected and for projecting the image may be costly.

DETAILED DESCRIPTION

Figure 1:
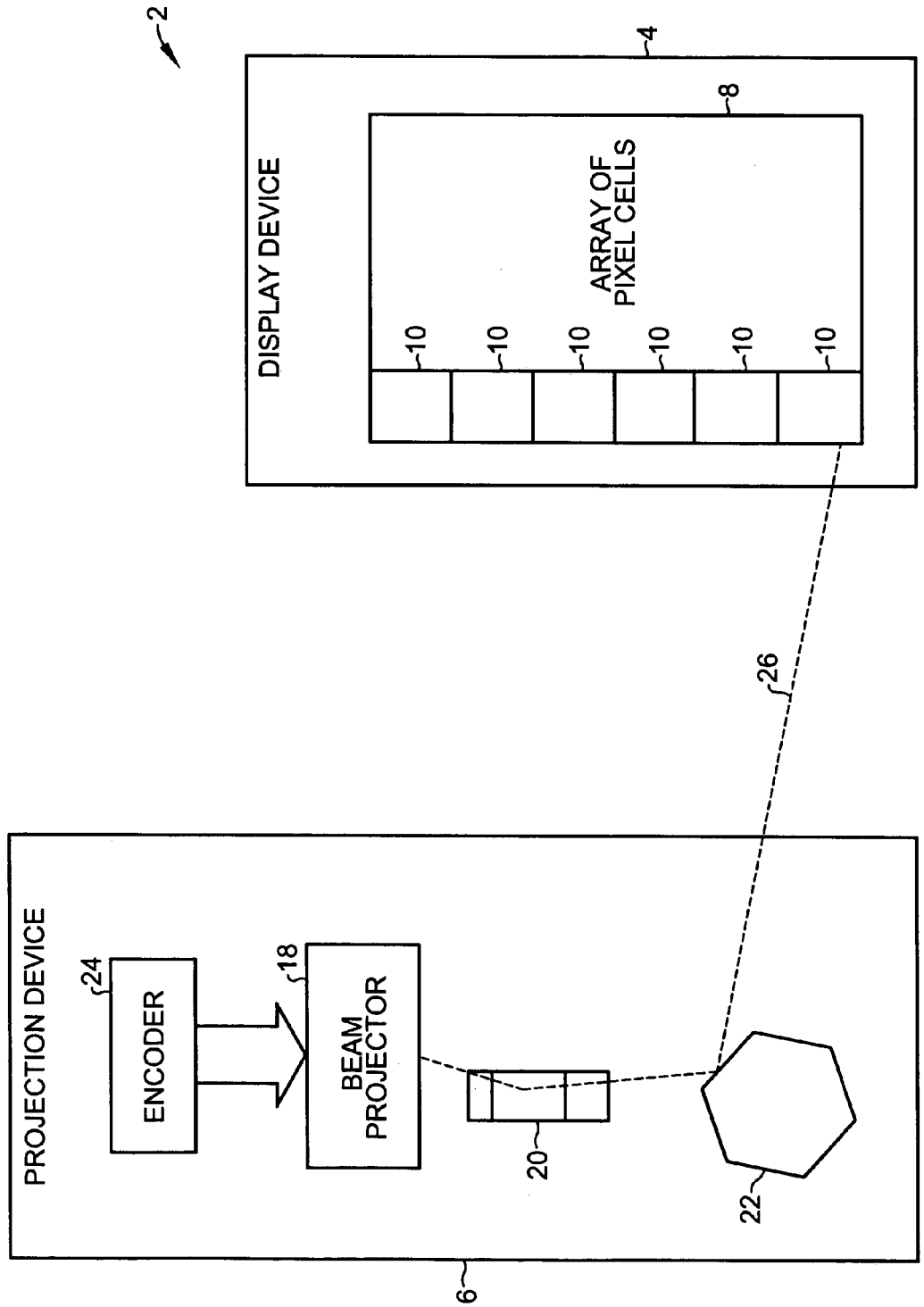
FIG. 1 is a block diagram of an embodiment of the display system

FIG. 1 shows one embodiment of a display system 2 for displaying an image. In one embodiment, display system 2 includes a display 4 and a projection device 6.

In one embodiment, a display, such as display 4, includes an array 8 of pixel cells 10. In one embodiment, projection device 6 includes a beam projector 18, a pair of rotating multi-faceted mirrors 20, 22, and an encoder 24.

Encoder 24 may be any apparatus or system configured to encode data for each pixel cell of display 4, the encoded data is configured to selectively activate display 4 to display an image.

Beam projector 6 emits beam 26 for transmission of the encoded data to display 4. In one embodiment, beam projector 24 is any collimated emitter. In one embodiment, beam projector 24 is a laser diode emitter. Beam 26 may be any type of beam capable of carrying encoded data. For example, beam 26 may be visible or invisible light. One example of invisible light is infrared light. Where beam 26 is an Infrared light beam, beam projector 24 includes an infrared emitter.

In one embodiment, encoder 24 controls beam projector 18 to encode data into beam 26. In one embodiment, beam projector 24 is modulated by Pulse Coded Modulation (PCM) of the data.

Figure 2:
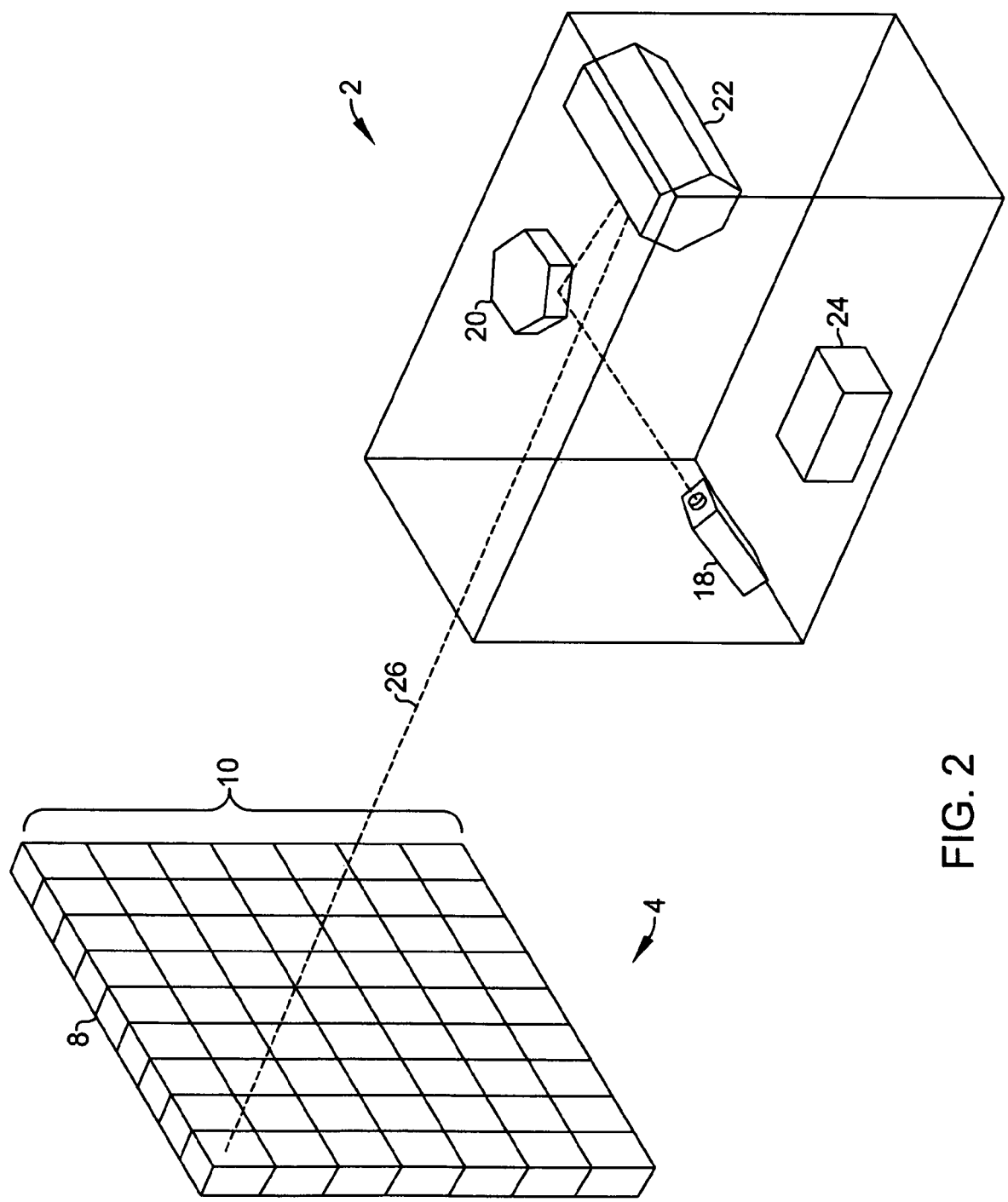
FIG. 2 is an illustration of an embodiment of the display system.

Rotating multi-faceted mirrors 20, 22 may be any rotating reflective surfaces. In one embodiment, the mirror rotation rate for mirrors 20, 22 is set by the number of facets and the display frame rate. Although mirrors 20, 22 are depicted in FIGS. 1 and 2 as having six facets each, each mirror 20, 22 may have any suitable number of facets. Rotating mirrors 20, 22 act together to sweep beam 26 across array 8 of pixel cells 10 so that each pixel cell receives encoded data from beam 26. In one embodiment, beam 26 is swept across array 8 of pixel cells 10 in such a way that an entire display frame of information is transmitted as each sweep of array 8 of cells 10 occurs. During each sweep, the laser sends packets of PCM data. Each packet aligns with and corresponds with one pixel cell on display 4. The packet contains the display information for that pixel for the current frame.

Alternatively, mirrors 20, 22 are replaced by any other type of apparatus for causing the sweep of beam 26 across array 8 of pixel cells 10.

Figure 3:
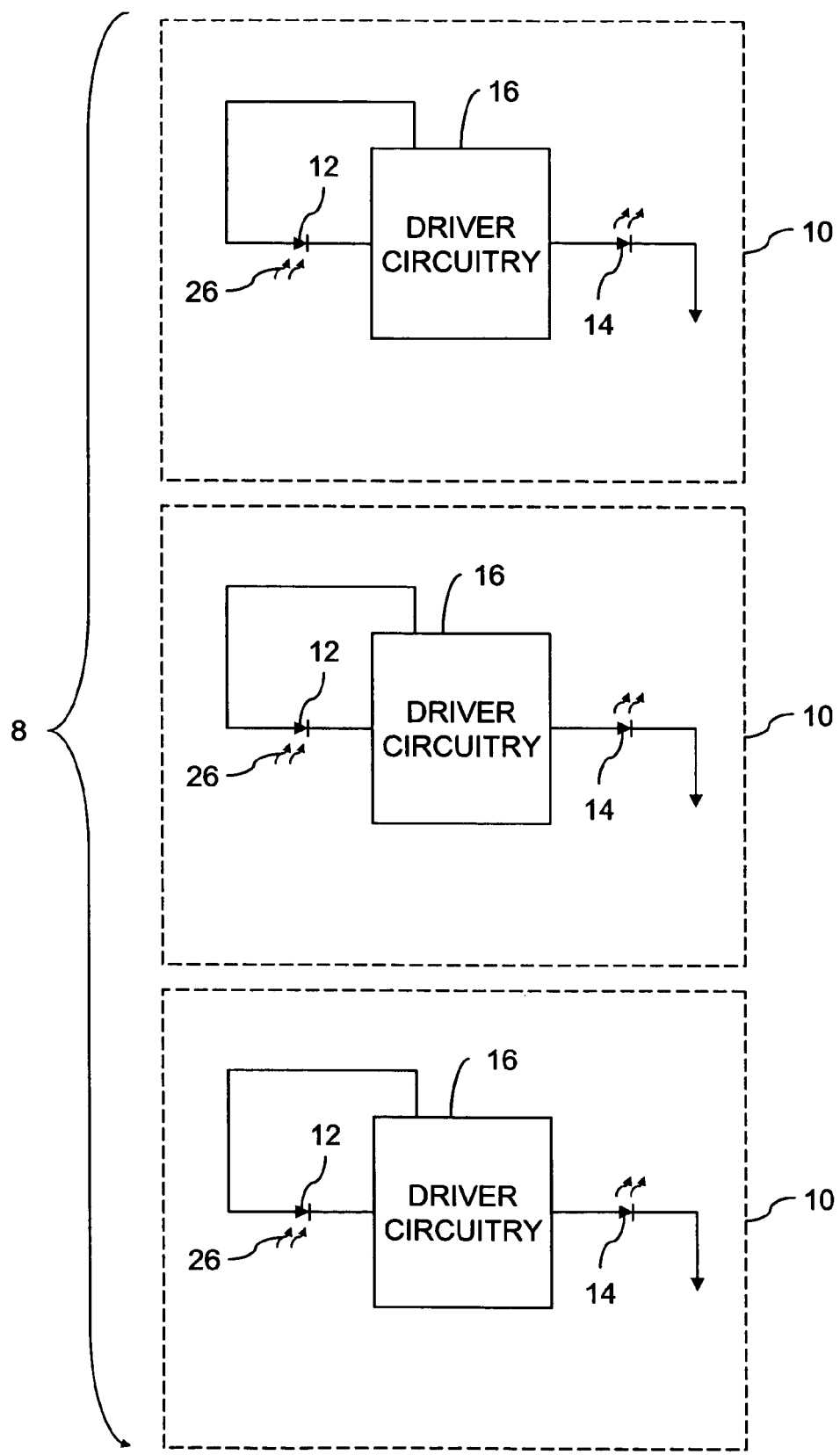
FIG. 3 is a diagram of an embodiment of the array of pixel cells of FIGS. 1 and 2.

FIG. 3 illustrates one embodiment of array 8 of pixel cells 10. Each pixel cell 10 includes a beam receptor 12, a light source 14, and driver circuitry 16.

Each beam receptor 12 for each pixel cell 10 is configured to convey the encoded data to driver circuitry 16 for pixel cell 10. Driver circuitry 16 is configured to selectively activate light source 14 of each pixel cell to display the image.

In one alternative embodiment, array 8 of pixel cells 10 is configured with liquid crystal diodes (LCD) cells in place of light source 14. One or more light sources are then provided behind the LCD cells to produce a visible image.

In another alternate embodiment, array 8 of pixel cells 10 is configured with microelectricalmechanical (MEMS) cells, such as fabry perot cavities, in place of light source 14. One or more light sources then illuminate the MEMS cells to produce a visible image.

Referring now to the embodiment disclosed in FIGS. 1 and 2, beam projector 18 is disposed to project a beam 26 of encoded data for sequential reception by beam receptors 18 of pixel cells 10. As each pixel cell 10 is traversed by beam 26, the encoded data is picked up by each beam receptor 12 and is processed by each driver circuitry 16 so that each pixel cell 10 is provided with the appropriate display data for display by each light source 14.

Figure 4:
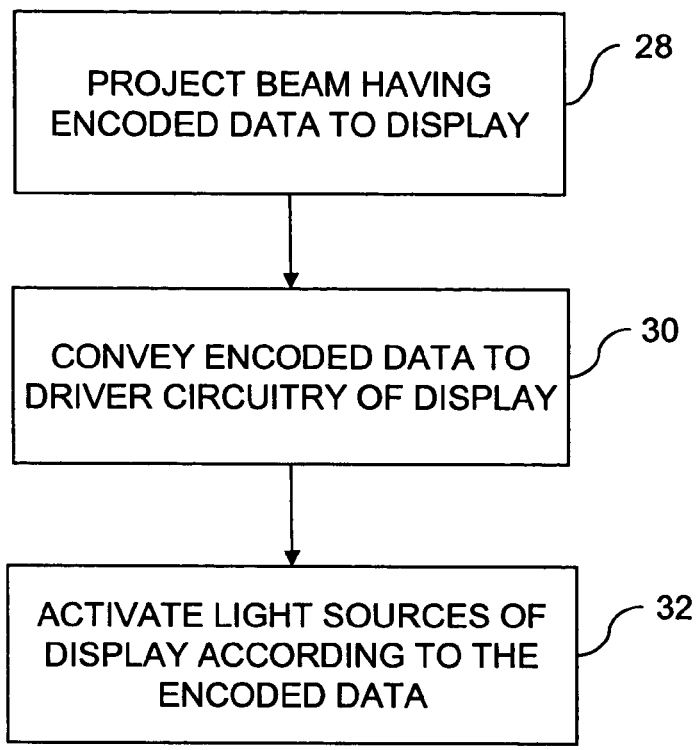
FIG. 4 is a flow chart illustrating one embodiment of a method for displaying an image.

FIG. 4 is a flow chart representing steps of one embodiment of the disclosed method for displaying an image. Although the steps represented in FIG. 4 are presented in a specific order, the present disclosure encompasses variations in the order of steps. Furthermore, additional steps may be executed between the steps illustrated in FIG. 4 without departing from the scope of claimed subject matter.

A beam 26 having encoded data is projected 28 for reception by beam receptors 12 of pixel cells 10 of display 4. In one embodiment projection is done so that the encoded data is received sequentially by beam receptors 12. Beam receptors 12 convey encoded data from beam 26 to driver circuitry 16 for each pixel cell 10 of display 4. Light sources 14 of each pixel cell 10 of display 4 are selectively activated by driver circuitry 16, according to the encoded data, to display an image on display 4.

Figure 5:
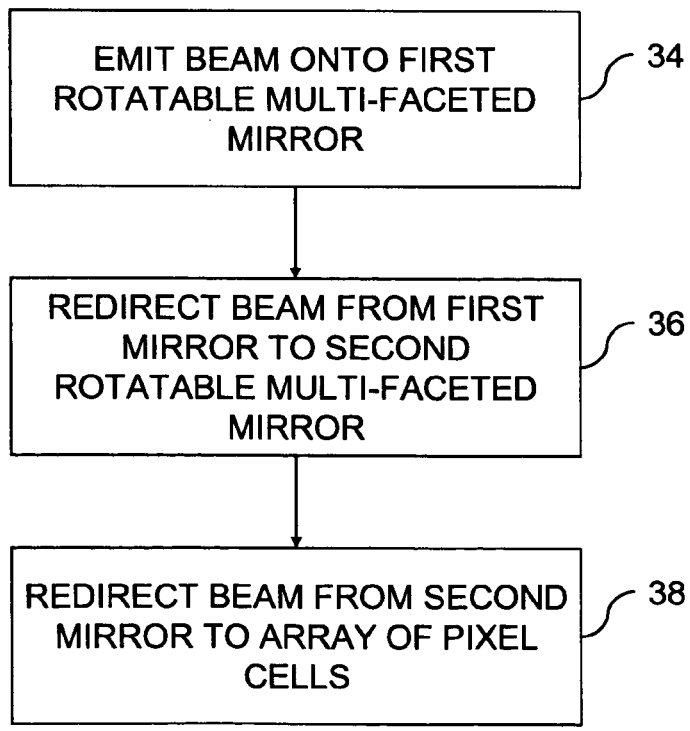
FIG. 5 is a flow chart illustrating one embodiment of the projecting the beam in FIG. 4.

One embodiment for projecting 28 beam 26 is illustrated in FIG. 5. Although the steps represented in FIG. 5 are presented in a specific order, the present disclosure encompasses variations in the order of steps. Furthermore, additional steps may be executed between the steps illustrated in FIG. 5 without departing from the scope of claimed subject matter.

Beam 26 is emitted 34 onto first rotatable multi-faceted mirror 20. Mirror 20 redirects beam 26 to second rotatable multi-faceted mirror 22. Mirror 22 redirects beam 26 to array 8 of pixel cells 10.

In one embodiment, first mirror 20 is oriented with its axis in the vertical direction. This causes beam 26 to make a repeating horizontal sweep. This swept beam is directed at second mirror 22. Second mirror 22 has its axis oriented in the horizontal direction. This causes the horizontally swept beam 26 to add a vertical sweep component. In one embodiment, the rate of rotation of second mirror 22 is substantially slower than that of first mirror 20. This results in an area sweep of array 8 of pixel cells 10.

Examples of factors which affect the rates of rotation of mirrors 20, 22 include the desired display frame rate, the numbers of facets of mirrors 20, 22, and the number of rows in array 8. In one embodiment, the rate of rotation of mirror 20 may be calculated by dividing the product of the frame rate and the number of rows in array 8 by the number of facets of mirror 20 and the rate of rotation of mirror 22 may be calculated by the frame rate by the number of facets of mirror 22.

For example, if the desired frame rate is 30 frames per second (fps), array 8 has 500 rows, and mirror 20 has 12 facets, the rate of rotation of mirror 20 may be calculated as: 30 fps*500 rows/12 facets=1,250 rev/sec. If, in addition, mirror 22 has 12 facets, the rate of rotation of mirror 22 may be calculated as 30 fps/6 facets=5 revs/sec.

Alternatively, first mirror 20 is oriented with its axis in the horizontal direction and second mirror 22 has its axis oriented in the vertical direction. The rate of rotation of first mirror 20 is substantially slower than that of second mirror 22. This again results in a sweep of beam 26 horizontally and vertically across array 8 of pixel cells 10.

In one embodiment, the rate of rotation of mirror 20 may be calculated by dividing the product of the frame rate and the number of columns in array 8 by the number of facets of mirror 20 and the rate of rotation of mirror 22 may be calculated by the frame rate by the number of facets of mirror 22. For example, if the desired frame rate is 30 frames per second (fps), array 8 has 500 columns, and mirror 20 has 12 facets, the rate of rotation of mirror 20 may be calculated as: 30 fps*500 columns/12 facets=1,250 rev/sec. If, in addition, mirror 22 has 12 facets, the rate of rotation of mirror 22 may be calculated as 30 fps/6 facets=5 revs/sec.

Inexpensive components may be used for rotating mirrors 20, 22. Laser selection will depend on many system parameters, but may be of relatively low power and cost.

The foregoing description is only illustrative of some embodiments. Various alternatives, modifications, and variances can be devised by those skilled in the art without departing from the scope of claimed subject matter. Accordingly, the present disclosure embraces all such alternatives, modifications, and variances that fall within the scope of the appended claims.

What is claimed is:

1. A display system comprising:
   a device configured to project an infrared beam including pulse coded modulated encoded data and
   a display including an array of pixel cells each including an infrared beam receptor, a light source, and driver circuitry configured to selectively activate the respective light source for the respective pixel cell according to the encoded data contained in the pulse coded modulated encoded data received from the device.

2. The display system of claim 1 wherein the infra-red beam includes a laser beam.

3. The display system of claim 1 wherein the device includes a collimated emitter.

4. The display system of claim 1 wherein the device includes a laser diode emitter.

5. The display system of claim 1 wherein the device includes first and second rotatable multi-faceted mirrors, the first mirror disposed to receive the infra-red beam and redirect the infra-red beam to the second rotatable mirror, the second mirror positioned to redirect the infra-red beam to the array of pixel cells.

6. The display system of claim 5 wherein the rate of rotation of the second mirror is substantially slower than the rate of rotation of the first mirror.

7. The display system of claim 5 wherein the rate of rotation of the first mirror is substantially slower than the rate of rotation of the second mirror.

8. The display system of claim 5 wherein the axis of rotation of the first mirror is perpendicular to the axis of rotation of the second mirror.

9. The display system of claim 5 wherein the axis of rotation of the first mirror is vertical and the axis of rotation of the second mirror is horizontal.

10. A display comprising:
    an array of pixel cells, each pixel cell including an infrared beam receptor, a light source, and driver circuitry and
    wherein the beam receptor for each pixel cell is configured to receive at least one infrared beam including pulse coded modulated encoded data and to convey the pulse coded modulated encoded data to the driver circuitry for the pixel cell and wherein the driver circuitry is configured to selectively activate the light source of each pixel cell to display an image based upon data contained in the pulse coded modulated encoded data.

11. A projection device for displaying an image on a display having an array of pixel cells, each pixel cell including an infrared beam receptor, a light source and driver circuitry, the projection device comprising:
    a pulse coded modulated encoder configured to encode data, the encoded data containing data configured to control selective activation of the light sources of the pixel cells; and
    an infrared beam projector disposed to project at least one infrared light beam including the encoded data to the infrared beam receptors of the pixel cells, and wherein the driver circuitry is configured to employ the data contained in the encoded data to selectively activate the light sources to form the image.

12. The projection device of claim 11 wherein the pulse code modulated encoder is configured to encode data for each pixel cell of the display.

13. The projection device of claim 11 wherein the beam projector includes a collimated emitter.

14. The projection device of claim 11 wherein the beam projector includes a laser diode emitter.

15. The projection device of claim 11 wherein the infrared beam projector includes first and second rotatable multi-faceted mirrors, the first mirror disposed to receive the infrared beam and redirect the beam to the second rotatable mirror, the second mirror positioned to redirect the infrared beam to the array of pixel cells.

16. A method for displaying an image, the method comprising:
    projecting an infrared light beam including pulse code modulated encoded data to a display, the display having individual light sources for each pixel and
    selectively activating the individual light sources of the display, according to data contained in the pulse code modulated encoded data, to display the image.

17. The method of claim 16 wherein projecting the infrared beam includes projecting the beam for reception by infrared beam receptors of the display.

18. The method of claim 17 further including the infrared beam receptors conveying the pulse coded modulated encoded data to driver circuitry of the display.

19. The display system of claim 18 wherein the driver circuitry selectively activates the light sources to display an image.

20. The method of claim 16 wherein projecting the infrared beam includes:
    emitting the infrared beam onto a first rotatable multi-faceted mirror,
    redirecting the infrared beam from the first mirror to a second rotatable multi-faceted mirror, and
    redirecting the infrared beam from the second mirror to the array of pixel cells.

21. A display for displaying an image, the display comprising:
    an array of pixel cells, each pixel cell including a light source and means for receiving an infrared beam of pulse coded modulated encoded data, wherein the light sources are configured to be selectively activated based upon data contained in the pulse coded modulated encoded data, to display the image and means for projecting an infrared beam of pulse coded modulated encoded data for reception by the pixel cells.

22. A display for displaying an image, the display comprising:

a plurality of light sources, wherein each light source is part of a respective pixel cell; and means for receiving an infrared beam including pulse coded modulated encoded data and selectively activating the plurality of light sources, responsive to the pulse coded modulated encoded data, to display the image, wherein the pulse coded modulated encoded data comprises data pertaining to selective activation of the plurality of light sources.

23. A projector for displaying an image on a display having beam receptors and light sources, the projector comprising:

means for pulse coded modulated encoding data to selectively activate the light sources of the display to display the image, wherein each light source is part of a respective pixel cell; and means for projecting the pulse coded modulated encoded data, in one infrared beam, onto the infrared beam receptors, wherein the light sources are selectively activated based upon the encoded data received through the one infrared beam.

* * * * *